US012664622B2

(12) United States Patent
Hanwell

(10) Patent No.: US 12,664,622 B2
(45) Date of Patent: Jun. 23, 2026

(54) METHODS FOR REDUCING THE APPEARANCE OF BLOCK-RELATED ARTIFACTS

(71) Applicant: Arm Limited, Cambridge (GB)

(72) Inventor: David Hanwell, Sale (GB)

(73) Assignee: Arm Limited, Cambridge (GB)

( * ) Notice: Subject to any disclaimer, the term of this patent is extended or adjusted under 35 U.S.C. 154(b) by 377 days.

(21) Appl. No.: 18/240,674

(22) Filed: Aug. 31, 2023

(65) Prior Publication Data

US 2025/0078224 A1 Mar. 6, 2025

(51) Int. Cl.
G06T 5/80 (2024.01)
G06T 3/20 (2006.01)
G06T 7/174 (2017.01)

(52) U.S. Cl.
CPC ................... G06T 5/80 (2024.01); G06T 3/20 (2013.01); G06T 7/174 (2017.01); G06T 2207/10016 (2013.01); G06T 2207/20132 (2013.01)

(58) Field of Classification Search
CPC .. G06T 5/80; G06T 3/20; G06T 7/174; G06T 2207/10016; G06T 2207/20132; H04N 19/117; H04N 19/176; H04N 19/86
See application file for complete search history.

(56) References Cited

U.S. PATENT DOCUMENTS

| | | | | |
|---|---|---|---|---|
| 6,473,463 B2 * | 10/2002 | Agarwal | .............. | H04N 19/119 |
| | | | | 375/E7.189 |
| 2001/0022815 A1 * | 9/2001 | Agarwal | .............. | H04N 19/119 |
| | | | | 375/240.18 |
| 2003/0053708 A1 * | 3/2003 | Kryukov | ................ | H04N 19/86 |
| | | | | 382/268 |
| 2011/0002388 A1 * | 1/2011 | Karczewicz | ......... | H04N 19/573 |
| | | | | 375/E7.125 |
| 2011/0019934 A1 * | 1/2011 | Ledinh | ................... | H04N 19/61 |
| | | | | 382/260 |
| 2012/0044989 A1 * | 2/2012 | Ahuja | .................. | H04N 19/117 |
| | | | | 375/E7.076 |
| 2017/0223377 A1 * | 8/2017 | Bankoski | ............. | H04N 19/176 |
| 2020/0296417 A1 * | 9/2020 | Ko | .......................... | H04N 19/70 |

FOREIGN PATENT DOCUMENTS

| | | | | |
|---|---|---|---|---|
| JP | 2004207862 A | * | 7/2004 | |
| JP | 2006013766 A | * | 1/2006 | ............. H04N 19/59 |

* cited by examiner

*Primary Examiner* — Henok Shiferaw
*Assistant Examiner* — Woo C Rhim
(74) *Attorney, Agent, or Firm* — EIP US LLP

(57) ABSTRACT

Methods and systems for reducing the appearance of block-related artifacts are described. The methods include obtaining image frames in a sequence of image frames and adjusting some or all image frames in the sequence of image frames to generate adjusted image frames. The adjusted image frames may be created by generating image data and adding it to one or more edges of the image frame or by discarding image data from the image frame. The adjusted image frames shift a block origin relative to image data in the image frame. The adjusting is performed so that the shift of the block origin varies during the sequence of image frames. A block-based process is applied to each adjusted image frame to generate processed image frames, wherein blocks of image data are selected and processed in each adjusted frame of image data according to the block origin.

20 Claims, 6 Drawing Sheets

METHODS FOR REDUCING THE APPEARANCE OF BLOCK-RELATED ARTIFACTS

BACKGROUND

Technical Field

The present invention relates to methods for reducing the appearance of block-related artifacts.

Background

In image processing, deblocking filters are used to mitigate artifacts that arise from block-based processing techniques, such as compression of images or video. Block-based techniques divide an image frame into smaller regions, referred to as blocks, for more efficient processing. However, as the processing is performed block-by-block, block-based image processing methods can lead to visible artifacts at block boundaries due to discontinuities in pixel values. Deblocking filters aim to reduce these artifacts and create a smoother transition between blocks.

Several different deblocking filters are known. For example, a Sobel operator or other high pass filter may be used to identify edges in the image and smoothly interpolate pixel values near these edges to reduce the visible block artifacts. Some video codecs include deblocking filters, such as the H.264 deblocking filter known from the ITU H.264 standard.

Deblocking filters play a role in improving the visual quality of images and videos when block-based processing is employed. However, deblocking filters require additional processing and logic to be applied during image processing, memory to store the image data for deblocking, and some degree of tuning of the detection and correction. Accordingly, simple techniques for reducing the appearance of block artifacts in resource constrained systems are desirable.

SUMMARY

According to a first aspect there is provided a method for reducing the appearance of block-related artifacts, the method comprising: obtaining image frames in a sequence of image frames; adjusting some or all image frames in the sequence of image frames to generate adjusted image frames to shift a block origin relative to image data of the image frame so that the position of the block origin relative to the original image frame varies during the sequence of image frames; and applying a block-based process to each adjusted image frame in the sequence of image frames to generate processed image frames, wherein blocks of image data are selected and processed in each adjusted frame of image data according to the block origin.

According to a second aspect there is provided a system for reducing the appearance of block-related artifacts, the system comprising: one or more processors and one or more storage, wherein one or more storage stores computer-readable instructions that when executed by the one or more processors cause the system to: receive image frames in a sequence of image frames; adjust some or all image frames in the sequence of image frames to generate adjusted image frames to shift a block origin relative to image data of the image frame so that the position of the block origin relative to the original image frame varies during the sequence of image frames; and apply a block-based process to each adjusted image frame in the sequence of image frames to generate processed image frames, wherein blocks of image data are selected and processed in each adjusted frame of image data according to the block origin.

According to a third aspect there is provided a non-transitory computer readable storage medium storing a program that, when executed by an information processing apparatus, causes the information processing apparatus to perform a method comprising: obtaining image frames in a sequence of image frames; adjusting some or all image frames in the sequence of image frames to generate adjusted image frames to shift a block origin relative to image data of the image frame so that the position of the block origin relative to the original image frame varies during the sequence of image frames; and applying a block-based process to each adjusted image frame in the sequence of image frames to generate processed image frames, wherein blocks of image data are selected and processed in each adjusted frame of image data according to the block origin.

Further features and advantages of the invention will become apparent from the following description of preferred embodiments of the invention, given by way of example only, which is made with reference to the accompanying drawings.

DETAILED DESCRIPTION

Example Embodiments

Figure 1:
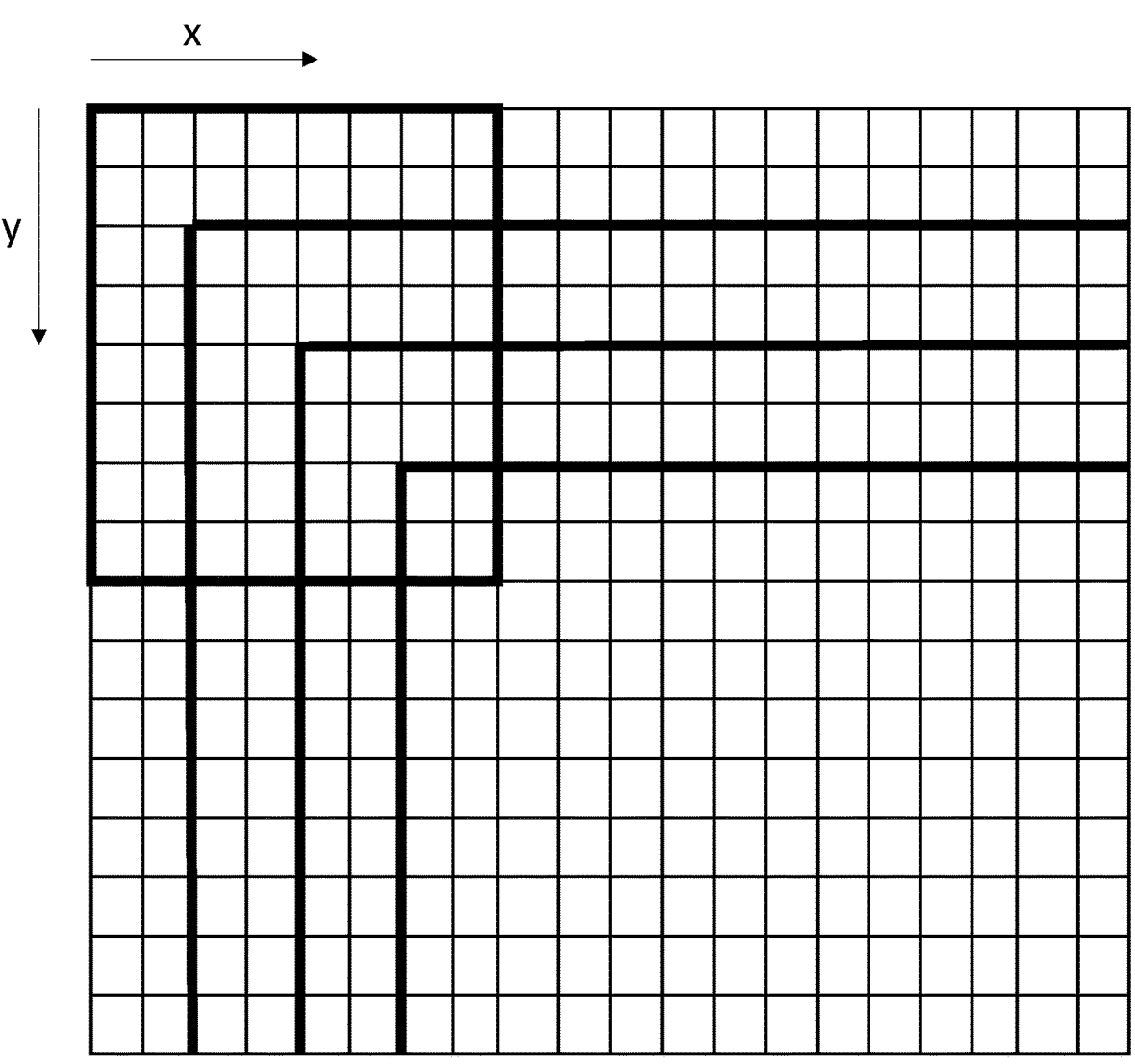
FIG. 1 illustrates a top-left portion of an image frame.

A first embodiment provides a method for reducing the appearance of block-related artifacts, the method comprising: obtaining image frames in a sequence of image frames; adjusting some or all image frames in the sequence of image frames to generate adjusted image frames to shift a block origin relative to image data of the image frame so that the position of the block origin relative to the original image frame varies during the sequence of image frames; and applying a block-based process to each adjusted image frame in the sequence of image frames to generate processed image frames, wherein blocks of image data are selected and processed in each adjusted frame of image data according to the block origin.

Adjusting the image data may comprise generating image data and adding it to one or more edges of the image frame or discarding image data from one or more edges of the image frame so as to shift the block origin relative to image data in the image frame.

The one or more edges may comprise an upper edge or a left-side edge. In such embodiments, applying the block-based process may comprise processing blocks sequentially from the block origin in row-major order.

In some embodiments the block-based process may be a video encoding process.

In other embodiments the block-based process may be an image compression process.

The method may comprise performing deprocessing corresponding to the block-based process to each processed frame in the sequence of image frames to generate deprocessed frames. Cropping may be performed on the deprocessed image frames to remove generated image data that has been added to one or more edges of the image frame and/or to crop the deprocessed image frame.

Some or all image frames may be adjusted to shift the block origin relative to the image data in the image frame in at least one of a horizontal dimension of the image frame and a vertical dimension of the image frame. Some or all images may adjusted to shift the block origin relative to the image data in the image frame in both the horizontal dimension of the image frame and the vertical dimension of the image frame. An extent and or variation during the sequence of image frames of the horizontal shift applied to the block origin relative to the image data in the image frame may be different to an extent and or variation during the sequence of image frames of the vertical shift applied to the block origin relative to the image data.

All image frames in the sequence of image frames may be adjusted. In such embodiments, some or all image frames in the sequence of image frames may be further adjusted to add or discard image data in order to keep all adjusted image frames the same size. In some embodiments, the further adjustment may comprise adding image data to at least one of the lower and right-side edges of the image frame. The size of all the image frames may be adjusted to be a multiple of the dimensions of the block size in one or both of the horizontal and vertical dimensions. Accordingly, following adjustment the frames may be the same size, larger than or smaller than the original frames.

A maximum shift of the block origin may be 50% or more of the block size. In some embodiments, the maximum shift of the block origin may be 75% or more of the block size.

The method may further comprise adding an indicator to each adjusted image frame to indicate how the frame has been adjusted. The cropping to remove image data from a deprocessed image frame may include reading the indicator associated with an image frame and cropping based on the read indicator.

The step of adjusting some or all the image frames and the step of cropping the deprocessed image frames may be synchronized based on position in the sequence of image frames so that the amount of image data removed by the cropping is determined based on the position of an image frame within the sequence of image frames.

In some embodiments, the method may be performed by a temporal denoising system. The steps of adjusting image frames and applying a block-based process to each adjusted image frame may be performed by a compressor. The steps of performing deprocessing corresponding to the block-based process and cropping the deprocessed image frames may be performed by a decompressor.

A temporal denoiser may perform a temporal denoising process based on received original image frames. The step of obtaining image frames in a sequence of image frames may comprise the compressor obtaining successive accumulated image frames that have been processed by the temporal denoiser. The decompressor may return decompressed accumulated image frames to the temporal denoiser.

A second embodiment may provide a system for reducing the appearance of block-related artifacts, the system comprising: one or more processors and one or more storage, wherein one or more storage stores computer-readable instructions that when executed by the one or more processors cause the system to: receive image frames in a sequence of image frames; adjust some or all image frames in the sequence of image frames to generate adjusted image frames to shift a block origin relative to image data of the image frame so that the position of the block origin relative to the original image frame varies during the sequence of image frames; and apply a block-based process to each adjusted image frame in the sequence of image frames to generate processed image frames, wherein blocks of image data are selected and processed in each adjusted frame of image data according to the block origin.

A third embodiment may provide a non-transitory computer readable storage medium storing a program that, when executed by an information processing apparatus, causes the information processing apparatus to perform a method comprising: obtaining image frames in a sequence of image frames; adjusting some or all image frames in the sequence of image frames to generate adjusted image frames to shift a block origin relative to image data of the image frame so that the position of the block origin relative to the original image frame varies during the sequence of image frames; and applying a block-based process to each adjusted image frame in the sequence of image frames to generate processed image frames, wherein blocks of image data are selected and processed in each adjusted frame of image data according to the block origin.

A fourth embodiment may provide a method for reducing the appearance of block-related artifacts, the method comprising: obtaining adjusted image frames in a sequence of adjusted image frames; applying a block-based process to each adjusted image frame in the sequence of image frames to generate processed image frames, wherein blocks of image data are selected and processed in each adjusted image frame according to a block origin; and adjusting some or all processed image frames to generate output image frames and to realign image data in each processed image frame.

A fifth embodiment may provide a system for reducing the appearance of block-related artifacts, the system comprising: one or more processors and one or more storage, wherein one or more storage stores computer-readable instructions that when executed by the one or more processors cause the system to: obtain adjusted image frames in a sequence of adjusted image frames; apply a block-based process to each adjusted image frame in the sequence of adjusted image frames to generate processed image frames, wherein blocks of image data are selected and processed in each adjusted image frame according to a block origin; and adjust some or all processed image frames to generate output image frames and to realign image data in each processed image frame.

A non-transitory computer-readable storage medium storing instructions to perform a method according to the fourth embodiment may also be provided.

Block-Based Image Processing

Block-based processing of images includes any technique that processes an image on a block-by-block basis. Examples of block-based image processing are block-based image compression and block-based video encoding.

Block-based image compression techniques are used to compress digital still images. These approaches involve dividing an image into blocks of image data which are smaller than the image frame, compressing each block independently, and then arranging the compressed blocks into a compact representation of the original image. Common steps in block-based image compression are:

Block Division: The input image is divided into non-overlapping blocks of fixed size (e.g., 8×8 or 16×16 pixels).

Transform: Each block is subjected to a mathematical transformation, often using techniques like the Discrete Cosine Transform (DCT) or Discrete Wavelet Transform (DWT). The transform converts spatial information into frequency information, allowing the most significant image features to be concentrated in fewer coefficients.

Quantization: The transformed coefficients are quantized, which involves reducing the precision of the coefficients. Higher-frequency coefficients are typically quantized more aggressively than lower-frequency coefficients. This step introduces loss of information, which contributes to compression.

Entropy Coding: Quantized coefficients are encoded using entropy coding techniques, such as Huffman coding or Arithmetic coding. These codes assign shorter codes to more frequently occurring coefficients, further reducing the data size.

Block Headers and Metadata: For efficient decoding, information about block sizes, quantization parameters, and other necessary data is included in the compressed stream. This allows the decoder to reconstruct the compressed image.

During decompression, the compressed image is processed in reverse order. Block headers are read to extract relevant information, entropy-coded data is decoded, and an inverse transform (e.g., inverse DCT or inverse DWT) is applied to reconstruct the pixel values. The reconstructed blocks are placed together to form the final decompressed image.

Block-based compression techniques include JPEG and HEIC. The compression technique may be a lossy compression technique because lossless compression techniques should, by definition, preserve the original image without loss and not introduce block-based artifacts.

Block-based video encoding is a block-based technique that similarly compresses and stores digital video by dividing frames into blocks that are smaller than the overall frame, processing these blocks individually, and then encoding the resulting data to reduce the amount of information needed for storage or transmission. Block-based video encoding techniques vary, but may involve:

Reduction in resolution: the RGB colour space data may be converted to YUV and chrominance components may be subsampled to reduce resolution as the human eye has lower sensitivity to colour information than to luminance.

Frame segmentation: frames are divided into non-overlapping blocks sometimes referred to as macro blocks, often blocks are 8×8 or 16×16 pixels.

Motion Estimation: In inter-frame compression, adjacent frames are compared to predict the motion of blocks from one frame to another. Motion estimation techniques identify the best matching block in a reference (I) frame to determine the motion vector (offset). P frames are predicted using image data from an earlier I frame, and B frames may be interpolated both from both preceding and succeeding frames. Block matching is performed to search for blocks in, for example, a preceding I frame to be used to predict the content of the current frame.

Prediction Error Determination: The difference between the identified image data in, for example, an image block from a preceding frame and the image block in the current frame is determined as a prediction error (residual).

Transform, quantization, and entropy encoding: Similar to the processing described in connection with still images, blocks of image data, whether original image data in an I frame or residual image data in a P or B frame, is subjected to a transformation (DCT or DWT), quantization and entropy encoding. For P and B frames the motion vectors may also be subjected to compression.

Frame Header and Metadata: Information about the frame's structure, motion vectors, quantization parameters, and other relevant data is included in the encoded stream. This metadata is used for accurate decoding.

As with image compression, the compressed video bitstream may be processed in reverse order to retrieve the encoded video stream.

Block-based video encoding, like MPEG, H.264 (Advanced Video Coding) or H.265 (High Efficiency Video Coding) standards, provide compression using techniques similar to those described above.

Block Origin Shifting to Reduce the Appearance of Artifacts

As noted in the introduction, when applying block-based processing, artifacts can arise due to the block-by-block nature of the processing not taking into account image data outside of the block, causing artifacts to appear at the boundaries between blocks. The blocks are typically squares or rectangles of image data sequentially selected for processing within an image frame. The blocks are often selected in row major order from a block origin in the top left corner of the image. While processing in row-major order will be described in detail below, the concepts described apply equally if blocks are selected in a different order, such as column major order.

According to techniques described herein, the appearance of block-related artifacts can be mitigated by shifting a block origin, which defines the position of the blocks in an image frame, relative to the image data to be processed. The shifting occurs on a per-frame basis such that, for example, shifting happens periodically in a sequence of frames. This technique reduces the appearance of block artifacts because rather than always appearing in the same position in each frame, artifacts will tend to appear in different positions corresponding to the shifted block boundaries. When viewing video, the frame rate will typically be high enough such that block artifacts which do not persist, such as by appearing regularly in roughly the same place, are difficult to perceive by a human viewer. Further, in applications such as temporal denoising which will be described further below, the shifting of the location of the error will tend to average out the errors.

FIG. 1 illustrates a top-left portion of an image frame. In the described example, the image data is Bayer image data received from a camera sensor. However, the techniques described herein are equally applicable to image data in other formats such as RGB, CMYK, HSL, etc. Each of the smallest squares in FIG. 1 represents a pixel, which has an associated intensity value represented by a pixel value in frame image data. Accordingly, FIG. 1 shows an array of 20 by 20 pixels from the top-left portion of the image frame. The frame extends further beneath and to the right, but these portions of the frame are not illustrated.

In thicker lines, at the top-left of FIG. 1 is shown a block depicted as a square having dimensions of 8×8 pixels. The block dimensions are purely illustrative and, as noted previously, different block-based image processing techniques may use different block sizes. The top-left block has a block origin of 0,0 on the x,y axes shown. This is a conventional location to start selecting blocks of image data when processing blocks of data from an image in row major order. Image blocks are processed across a frame by moving the block sequentially across the image in row-major order to process a sequence of blocks of image data until the image frame has been processed.

As noted above, the described embodiments shift the image data to be processed relative to the block origin over a sequence of frames. In order to shift the edges of the blocks relative to the image data in the image frame, the image frame may be expanded or reduced in dimensions so that the block processing starts in a different position relative to the original image data. In an example illustrated in FIG. 1, the original image data may be expanded by three different amounts. According to a first expansion of the original image data, new image data corresponding to two pixels width may be added to the upper and left-hand edges of the image frame. When the expanded image frame is processed by the block-based image processing, the block-based processing will start from the origin 0,0 as usual. However, because additional image data has been added to the upper and left-side edges, the block edges will fall in different positions relative to the original image data to be processed.

FIG. 1 shows two further examples of adjusted image data in which the frame of image data has been expanded by adding a band of newly created image data having a width of four and six pixels to the upper and left-side edges.

The newly generated image data may be generated in a number of different ways. Various techniques for generating new image data are known in the art. Constant value padding could be used that would add image data with a constant value as newly created image data. In other embodiments, reflect padding may be used in which pixels at the edges of the image frame are mirrored to create a boundary of reflected pixels. In other embodiments, wrap padding may be used in which pixels at the edges of the image are copied and appended to the opposite side of the image. This creates a continuous pattern that appears as if the image wraps around its edges. Other techniques for creating the new image data may be used.

In embodiments in which wrap padding is used, the image frame size may be kept constant. In such embodiments the image data is selected from the right-side of the image when adding image data to the left-side of the image. The image data selected from the right-side of the image may be cropped to keep the image frame size constant. Correspondingly, image data that is wrapped to the upper edge of the image frame from the lower edge may be cropped from the lower edge of the image frame.

In other embodiments, in order to keep the size of each image frame in a sequence of image frames constant, newly generated image data may also be added to the lower and right-side edges of image frames using the same techniques discussed above. In an example additional image data may be added to the lower and right-side edges so that the total width of image data added to the upper and lower and/or left-side and right-side edges totals six pixels in each frame. In this way the adjusted image frame always has the same size despite different shifts in the block origin.

Although the example above added image data to both the upper and left-side edges, in other embodiments, newly generated image data may be added to the upper and/or lower edges only, thereby shifting the block origin vertically with respect to the received image data. In other embodiments, newly generated image data may be added to the left-side and/or right-side edges only, thereby shifting the block origin horizontally with respect to the received image data.

Some embodiments shift the block origin in both the vertical and horizontal directions. However, the shift in the vertical and horizontal directions does not need to be by the same amount. In a further embodiment, the block size may be 16×4 pixels and the vertical offset may vary alternately between frames by 2 pixels i.e., in a first frame no additional image data is added to the top of the original image frame and in the next frame two pixels of additional image data is added to the top edge of the image frame. The horizontal offset may cycle between 0, 4, 8 and 12 pixels by adding corresponding amounts of additional image data to the left-side edge of the image frame.

When applying this technique to a sequence of images in a video stream, the shift of the block origin relative to the received image data may be performed periodically. In the example described in connection with FIG. 1 above, four different shifts are described—no shift, 2-pixel shift, 4-pixel shift, and 6-pixel shift. These four shifts could be cycled such that each new frame uses the next shift in the cycle. In other embodiments, the shift applied to an image in the video sequence may be varied every other frame or according to some other pattern. The shifts do not need to be applied cyclically and could be selected on a frame-by-frame basis at random or based on a pseudo random pattern.

An indicator that identifies the amount of additional image data that has been added to shift the block origin may be stored with the frame on a frame-by-frame basis. In other embodiments, a compressor/decompressor or encoder/decoder may be synchronized so that the shift of the block origin is known by virtue of the position of a frame in the sequence of images.

When the block-based processing is reversed, the image data may be decompressed or decoded in the usual manner. This may be referred to as applying a deprocessing corresponding to the block-based process to the image data. The additional image data added to each frame may be cropped/removed to recover the image data after decompression or decoding. The amount of additional image data to be removed may be determined by looking at an indicator stored with the image frame.

In embodiments that employ wrap padding the cropped image data may correspond to image data that is missing from an opposing side of the image frame. Accordingly, the cropped image data may be added to an opposing edge of the image frame to recover the image frame after decompression or decoding.

As noted above, rather than adding new data to the images, image data could be removed to shift the block origin. As varying amounts of image data would be removed from the image, the decompressed images may be cropped to reflect the largest offset so that all the decompressed images are the same size. This approach may be acceptable where the block size is small relative to the image size.

In the example described in connection with FIG. 1 above, four different block origins were illustrated separated by 2 pixels across a block size of 8×8 pixels. In some embodiments, the largest shift of the block origin will cause a shift of the block boundaries that is a high proportion of the block size. In some examples, the largest shift of the block boundaries will be at least 50% of the block size. In further examples, the largest shift of the block boundaries will be at least 75% of the block size. For example, in the example in FIG. 1, the block origin is shifted by at most 6 pixels vertically and horizontally, which represents 75% of the block size of 8 pixels. The largest shift will typically be less than one block size because a shift of one block will cause the blocks to line up again.

In other embodiments, the block size may be 16×16 pixels. In one implementation, the frame may be shifted both horizontally and vertically by 8 pixels each frame so that evenly numbered frames use blocks that are aligned with the top left corner of the frame and oddly numbered frames include 8 pixels of additional image data on the top and left-side edges so that the original image data starts in the middle of the first block of image data starting from the shifted block origin. This example corresponds to a largest shift of the block boundaries that is 50% of the block size.

The above embodiments add or remove image data from one or more edges of the image frames. In other embodiments further transformations could be considered. For example, the image data may be rotated or reflected to shift the block origin relative to the image data.

Temporal Denoising System

Temporal denoising in video processing refers to the process of reducing or removing unwanted noise from a video sequence by looking at the frames across time. For example, images captured by a digital camera sensor will include noise due to limitations of image capture technology. This noise, such as shot noise, is typically random and will vary from frame-to-frame. The noise may be increased by amplification in the digital image sensor, such as when shooting images at high ISO on a digital camera. This noise may appear as flickering, jittering, or unwanted variations in pixel values between frames.

Figure 2A:
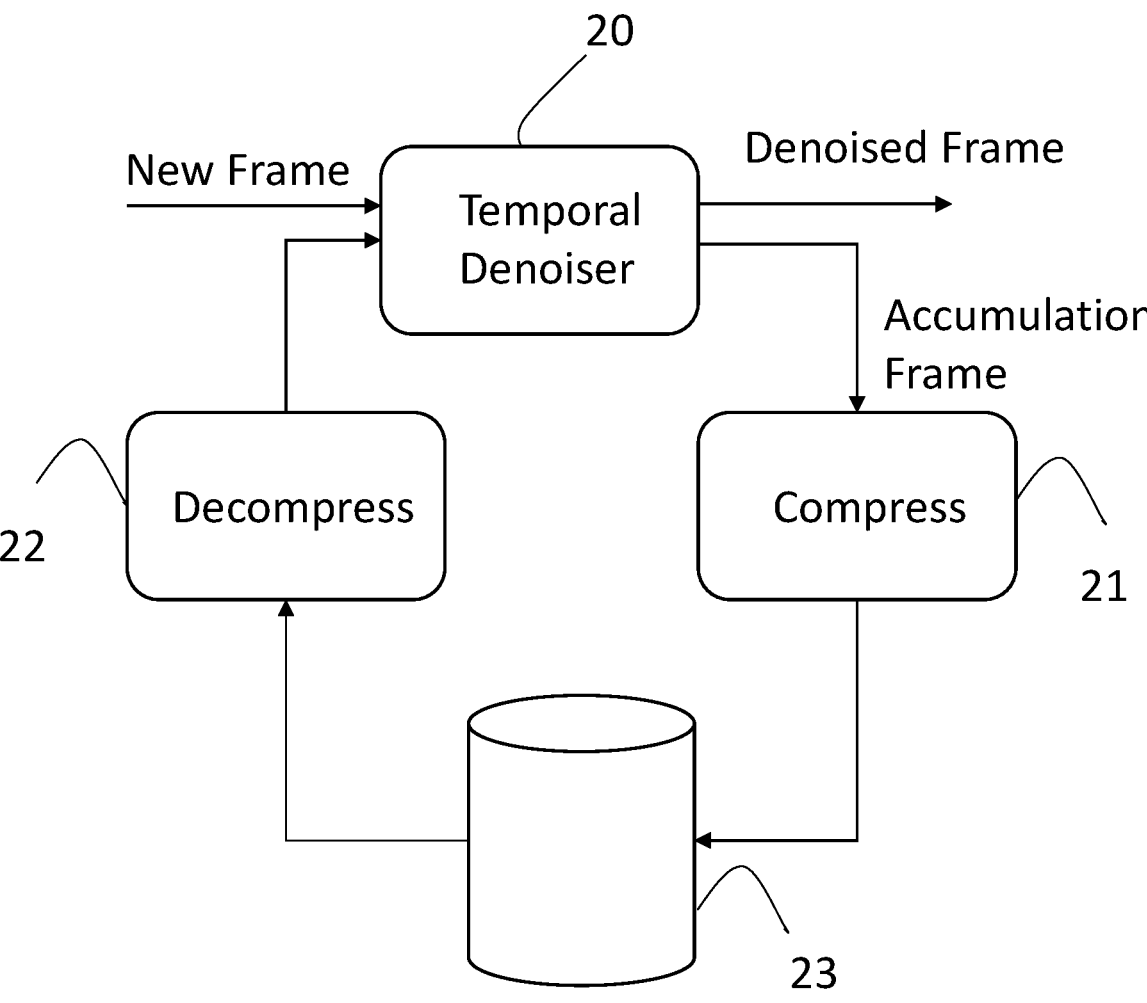
FIG. 2a is a schematic diagram showing the structure of a temporal denoising system.

Temporal denoising aims to improve the quality and clarity of a video by analysing and processing multiple frames together. FIG. 2a is a schematic diagram showing the structure of a temporal denoising system. The temporal denoising system may be implemented in an image signal processor (ISP). The illustrated temporal denoising system is particularly adapted to a system with low memory capacity. The basic concept of the temporal denoiser is to average together a number of consecutive frames, N, in order to reduce the impact of noise. As noted above, noise in the frames is random and the averaging process will tend to reduce the appearance of random noise which appears at different locations in each frame being averaged. On the other hand, image content in frames will typically persist between frames and will tend not be averaged out. Compensation may need to be made to allow for objects that may be moving during the frame sequence, but detailed discussion of motion compensation is omitted as it is known in the field of temporal denoising and is not relevant to the concept being described.

As memory resources are limited in the example given, two adaptations are made. Firstly, rather than storing N image frames and averaging the image frames together directly, an accumulated frame is generated. At first two frames are combined by a temporal denoiser 20. Following combination, the combined frames have their intensities divided by two to generate an accumulated frame. A third frame is subsequently received. The accumulated frame may be retrieved and have its pixel intensities be multiplied by two and then be combined with the third frame. The new frame may have its pixel intensities divided by three to arrive at a new accumulated frame. This process may be repeated for a series of newly received frames until the desired number of frames have been combined. In this way, the temporal denoiser may work on a frame-by-frame basis without needing to store N frames for combination. The number of frames accumulated by a temporal denoiser varies depending on application, but may be for example 6, 8, 10, 12 or greater number of frames.

A further development is the use of a block-based compression technique in a compressor 21 when storing the accumulated image and use of a corresponding block-based decompression technique in a decompressor 22. The compression and decompression reduce the size of the accumulated image that needs to be stored in an image memory 23 thereby further reducing memory requirements in the image memory 23, which may be SRAM or DRAM.

As the process of generating an accumulated image will involve multiple rounds of compressing and decompressing various iterations of the accumulated image as illustrated in FIG. 2a, there is a risk that block-based artifacts may accumulate and become noticeable in the denoised images.

In view of this, the block origin shifting technique described above may be employed in the compressor 21 and decompressor 22. At the compressor 21, at each round, the accumulated image received from the denoiser 20 is adjusted by adding some or no new image data to the top and left edges to shift the block origin relative to the image data to be encoded. As described above, new image data may also be added or removed at the lower and right-side edges as appropriate in order to keep the accumulated image sizes constant. The compressor then performs compression on the adjusted accumulated image and stores the adjusted accumulated image in image memory 23. The decompressor 22 reads the adjusted accumulated images from the image memory 23 and decompresses the adjusted accumulated image. In addition to decompressing the image in accordance with the decompression algorithm, the decompressor 22 discards or repositions the additional image data that has been added by the compressor 21. As noted above, an indicator may be added by the compressor 21 to the adjusted accumulated image. This indicator is passed with the compressed image data to indicate which image data in an image frame is additional image data. In other embodiments, the compressor and decompressor may be synchronized, and the additional image data may be identified on a cyclic basis. In such embodiments no indicator needs to be passed with the adjusted accumulated image between the compressor 21 and the decompressor 22.

The compression and decompression by the compressor 21 and decompressor 22 respectively may introduce block-based artifacts into the accumulated image. However, because the block origin is shifted periodically relative to the image data using the block origin shifting techniques described above, the error will tend to be distributed across the accumulated image and so will tend to average down (similar to the random noise) and be less noticeable to a human viewer.

Temporal denoising systems have many applications. However, common uses are in generating video streams from camera sensors. Accordingly, temporal denoisers may be found in applications such as cameras on laptop computers, security cameras, smart doorbells that include intercom facilities, etc.

Figure 2B:
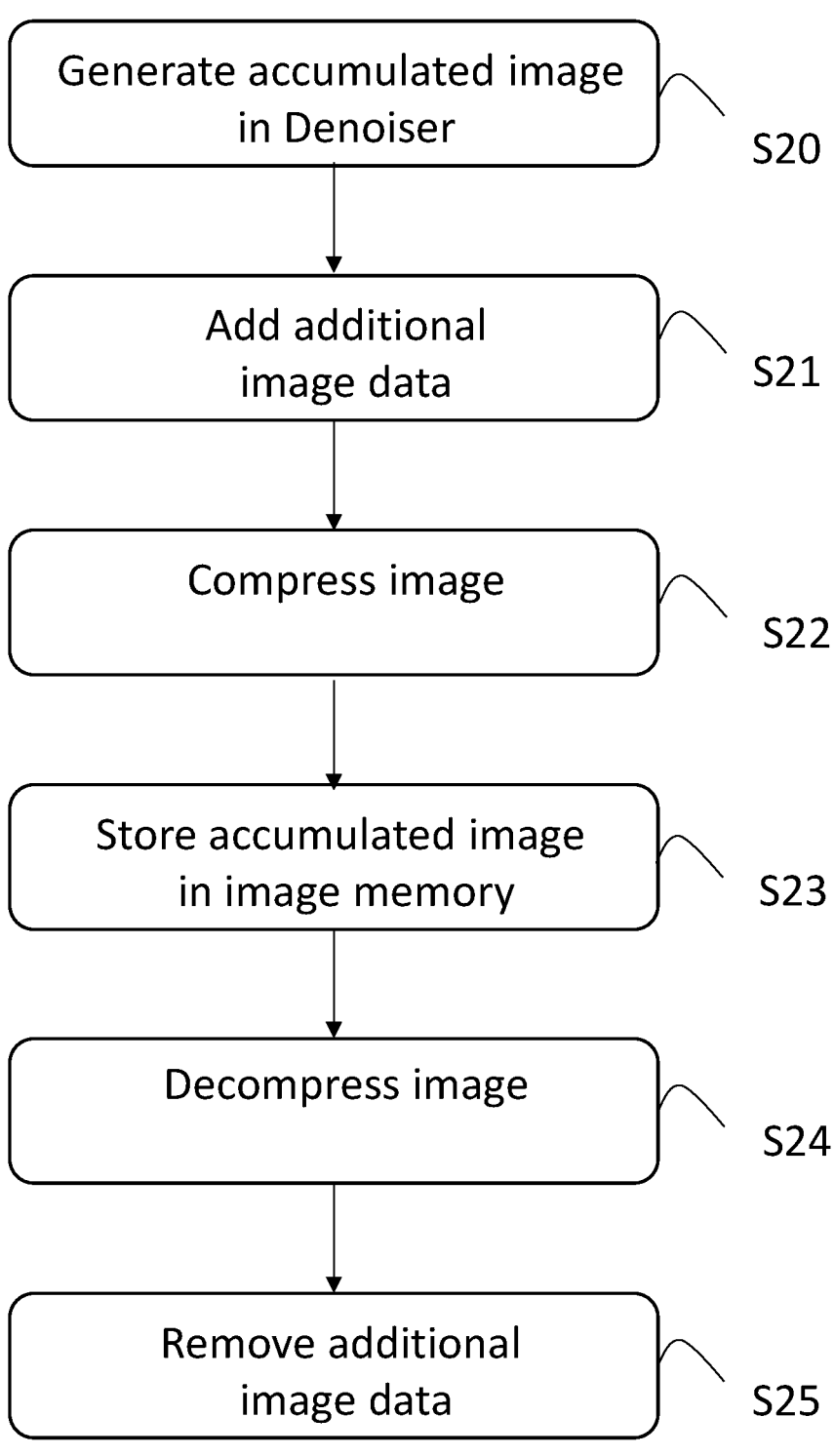
FIG. 2b is a chart showing steps performed by the temporal denoising system.

FIG. 2b is a chart showing steps performed in a temporal denoising system. The steps of the method will typically be repeated until N images have been processed at which point an accumulated image is output as a denoised image.

In step S20, an accumulated image is generated in the denoiser 20. As described above, this may initially involve combination of two image frames from video data, but subsequently involves combination of an accumulated image and a newly received image frame.

The accumulated image is output from denoiser 20 and received at the compressor 21. The compressor 21 adds additional image data to the accumulated image to generate an adjusted accumulated image in step S21. The amount of additional image data varies each time that method is repeated with a newly added frame until N frames have been processed in the temporal denoising method. In some iterations, no additional image data may be added such that the block origin is not shifted. Any of the techniques described above in connection with FIG. 1 may be applied to the temporal denoiser. For example, the four offsets shown in FIG. 1 may be cycled through, alternating offsets (no offset and an offset of 8 pixels) may be applied or any other offset pattern.

In step S22, the image data is compressed by the compressor 21 using a compression algorithm. Examples of block-based compression algorithms have been described above but may include without limitation JPEG and HEIC.

In step S23, the compressed image is sent from the compressor 21 and stored in the image memory 23.

In step S24, the compressed image is read from the image memory 23 by the decompressor 22 and is decompressed using a decompression algorithm corresponding to the compression algorithm applied by the compressor 21.

In step S25, the decompressor 22 removes the additional image data that was added by the compressor 21. The decompressed image is then passed to the denoiser 20. As noted above, the method shown in FIG. 2b may be repeated for a number of images N until N image frames have been combined in the temporal denoiser and a denoised image is output.

Video Encoding and Decoding System

As noted above, video encoding is another block-based image processing method.

Figure 3A:
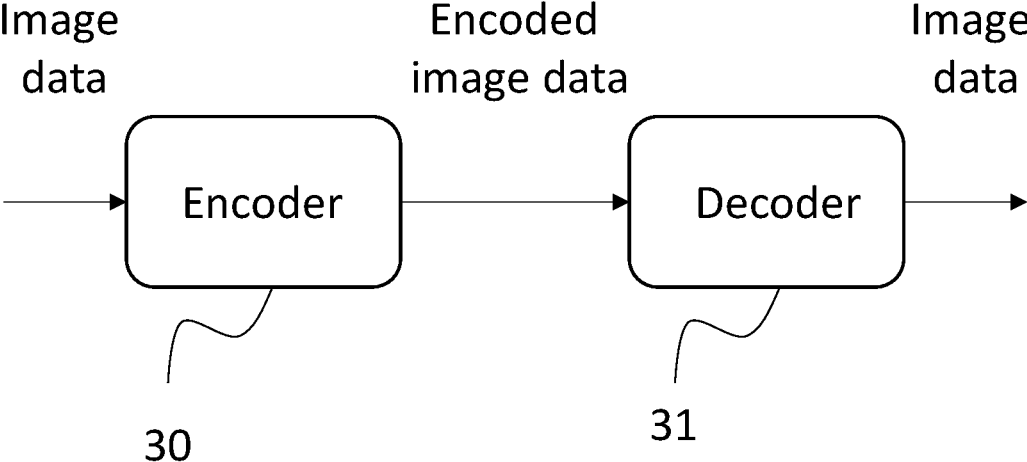
FIG. 3a is a schematic diagram showing a video encoding and decoding system.

FIG. 3a is a schematic diagram showing a video encoding and decoding system. Original video data is input to a video encoder 30, which performs a block-based video encoding method. The encoded image data may be transmitted, for example over the internet, and decoded by a video decoder 31 using a video decoding method corresponding to the video encoding method. For example, the video data may be decoded for display to an end user.

Figure 3B:
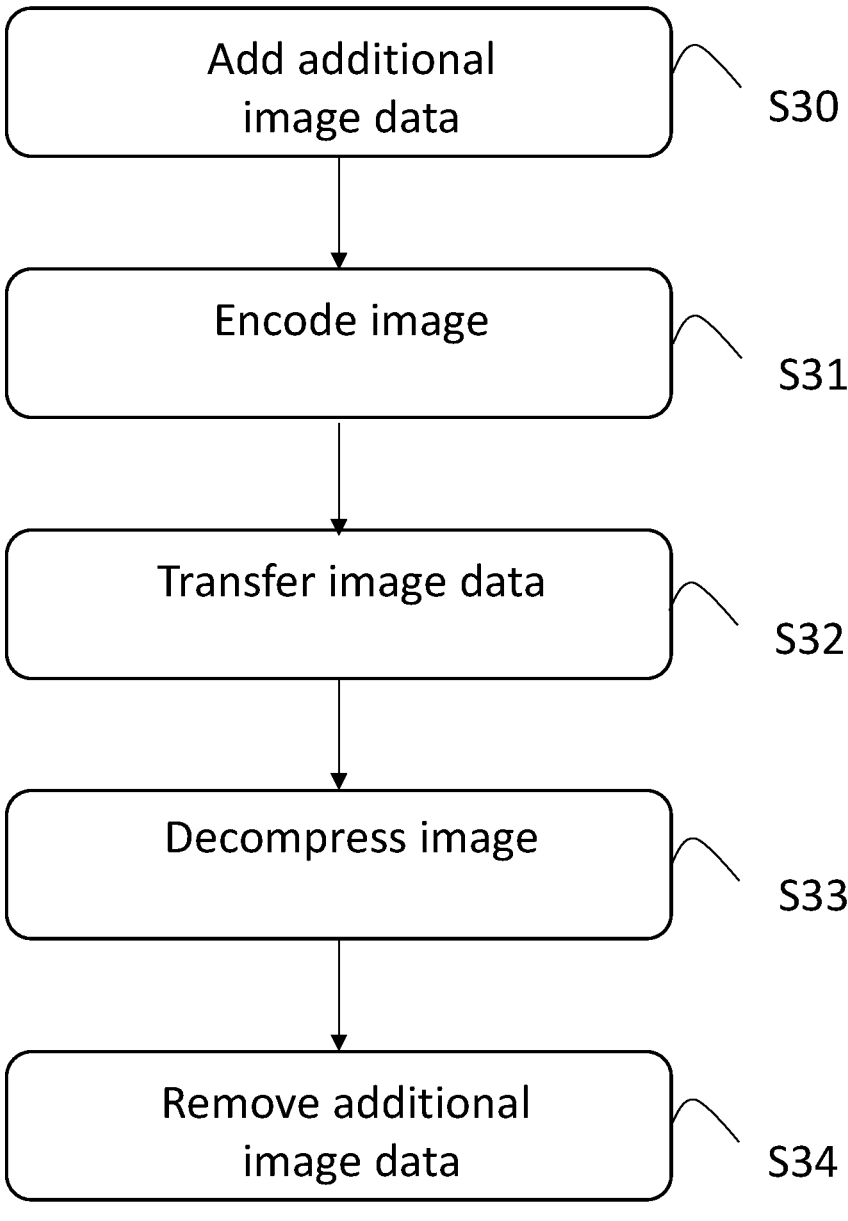
FIG. 3b is a chart showing steps performed by the video encoding and decoding system.

The video encoder 30 and video decoder 31 perform a method illustrated in FIG. 3b. In step S30, the video encoder 30, upon receipt of original video data to be encoded, adds some or no additional image data to each video frame to generate adjusted video frames. In accordance with the preceding description, an amount of additional image data added to each video frame to shift the block origin used for video encoding. Image data may be added to the top and/or left side of each video frame. The amount of new image data added to the top and/or left side of each video frame may vary periodically. For example, the amount of new image data added may vary with each successive frame encoded. An indicator may be added to the frames of video data processed by the encoder to indicate the pattern of new image data that has been added to the image to be encoded.

In step S31, the video encoder encodes the adjusted video frames using a known block-based video encoding algorithm. Examples of such block-based video encoding algorithms are, without limitation, MPEG, AVC, HEVC, and AV1.

In step S32, the encoded video data is transferred to the decoder. The nature of the transfer will depend on the particular application but may, for example, be a transfer over the internet.

In step S33, the encoded video data is received at the decoder 31. The decoder decodes the video data in accordance with the video compression method being used.

In step S34, the decoder 31 crops the decoded video frames by identifying a pattern of new image data that has been added to each video frame being decoded by examining the indicator associated with the video frame and removes the additional image data in order to recover a decoded video frame corresponding to the originally encoded video frame.

The pattern of new image data added to video frames is varied from frame-to-frame. Accordingly, the position of the block boundaries relative to the original video frames of video data being encoded shifts from frame to frame. Block-based artifacts may occur at the block boundaries. However, as frame rates for video playback are typically quite high (e.g., 24 frames per second) the block-based artifacts, such as edge roughness, will tend not to frequently occur consistently in the same location within the image frame due to the movement of the block boundaries and are therefore less likely to be noticeable for a human viewer.

In some examples, the image decoding process may additionally include temporal denoising either of the type described above or another temporal denoising technique. In such examples, because block-encoding related artifacts that occur will tend to be spread across the image frame, they will also tend to be averaged out during the temporal denoising process.

Information Processing Apparatus and Example Applications

Figure 4:
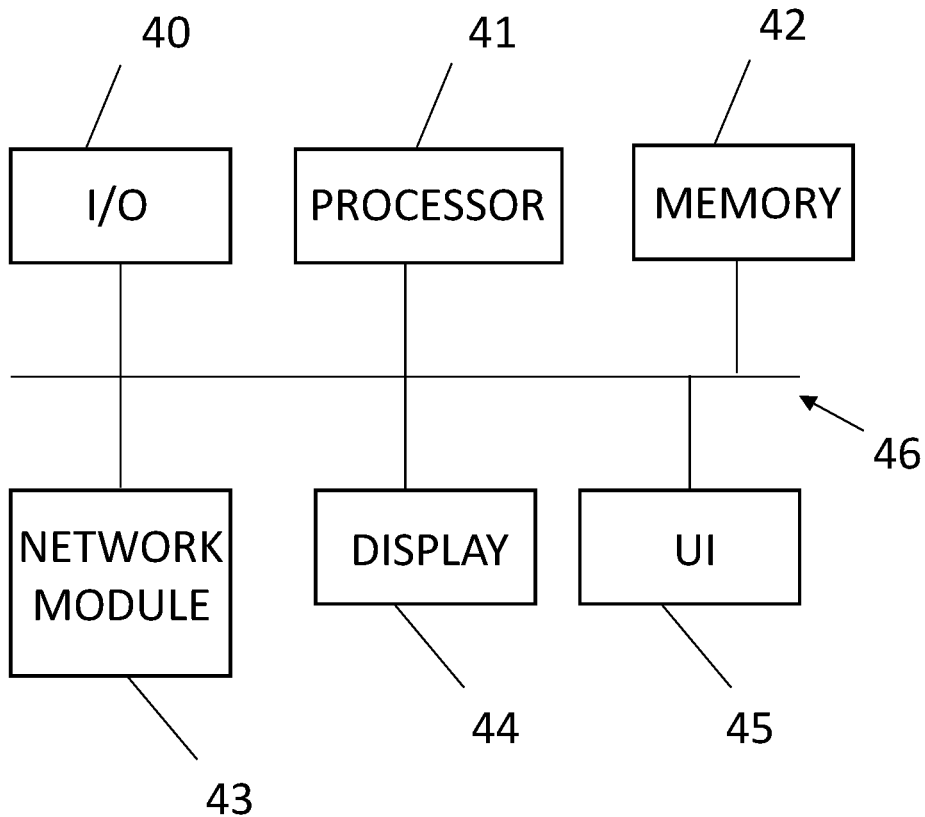
FIG. 4 is a schematic diagram of components of an example information processing apparatus.

Methods described above may be performed using one or more information processing apparatus, such as a computer, mobile device, laptop or server. The methods may also be performed by dedicated hardware circuits. FIG. 4 is a schematic diagram of components of an example information processing apparatus suitable for use in the methods described above. The diagram is illustrative and different hardware configurations for information processing apparatus are possible as is well known in the art. The information processing apparatus includes an I/O interface 40, such a USB port, Thunderbolt port, etc. to which an additional device, such as a storage device, could be connected. The information processing apparatus comprises a processor 41, a storage in the form of memory 42, a network module 43, a display 44, and a user interface 45. The network module may allow the information processing apparatus to communicate over a network such as a Wi-Fi network, a mobile telecommunications network, a local area network etc. The user interface may include components such as a keyboard, mouse, camera, etc. The components of the information processing apparatus may communicate with each other over a bus 46. Further components may be provided but are not shown or described. Any of the steps of the methods described above may be performed by computer-readable instructions of one or more programs stored in a storage and executed by a processor on one or more information processing apparatuses.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for reducing the appearance of block-related artifacts, the method comprising:
    obtaining image frames in a sequence of image frames;
    adjusting some or all image frames in the sequence of image frames to generate adjusted image frames to shift a block origin relative to image data of the image frame so that a position of the block origin relative to the image frame prior to shifting the block origin varies during the sequence of image frames, wherein adjusting the image data comprises generating image data and adding the generated image data to one or more edges of the image frame or discarding image data from one or more edges of the image frame, wherein an amount of generated image data added or discarded varies during the sequence of image frames; and applying a block-based process to each adjusted image frame in the sequence of image frames to generate processed image frames, wherein blocks of image data are selected and processed in each adjusted frame of image data according to the block origin.

2. The method according to claim 1, wherein the block-based process is a video encoding process.

3. The method according to claim 1, wherein the block-based process is an image compression process.

4. The method according to claim 1, further comprising:

performing a deprocessing corresponding to the block-based process to each processed frame in the sequence of image frames to generate deprocessed frames; and cropping the deprocessed image frames to perform one of: removing generated image data that has been added to one or more edges of the image frame and cropping the deprocessed image frame.

5. The method according to claim 1 wherein some or all image frames are adjusted to shift the block origin relative to the image data in the image frame in at least one of a horizontal dimension of the image frame and a vertical dimension of the image frame.

6. The method according to claim 5, wherein some or all image frames are adjusted to shift the block origin relative to the image data in the image frame in both the horizontal dimension of the image frame and the vertical dimension of the image frame.

7. The method according to claim 6, wherein at least one of:

an extent during the sequence of image frames of the horizontal shift applied to the block origin relative to the image data in the image frame is different to an extent during the sequence of image frames of the vertical shift applied to the block origin relative to the image data; and a variation during the sequence of image frames of the horizontal shift applied to the block origin relative to the image data in the image frame is different to a variation during the sequence of image frames of the vertical shift applied to the block origin relative to the image data.

8. The method according to claim 1 wherein all image frames in the sequence of image frames are adjusted, wherein some or all image frames in the sequence of image frames are further adjusted to add or discard image data in order to keep all adjusted image frames the same size.

9. The method according to claim 8, wherein some or all image frames in the sequence of image frames are adjusted to generate adjusted image frames by generating image data using wrap padding and adding the generated image data to one or more edges of the image frame, wherein the image frames are further adjusted to discard image data corresponding to the wrap padding in order to keep all adjusted frames that same size.

10. The method according to claim 1 wherein a maximum shift of the block origin is 50% or more of the block size.

11. The method according to claim 1 further comprising adding an indicator to each respective adjusted image frame to indicate how the respective adjusted image frame has been adjusted.

12. The method according to claim 4, wherein the step of adjusting some or all the image frames and the step of cropping the deprocessed image frames are synchronized based on position in the sequence of image frames so that an amount of image data removed by the cropping is determined based on the position of an image frame within the sequence of image frames.

13. The method according to claim 4, wherein the method is performed by a temporal denoising system, and wherein the steps of adjusting image frames and applying a block-based process to each adjusted image frame are performed by a compressor and the steps of performing a deprocessing corresponding to the block-based process and cropping the deprocessed image frames are performed by a decompressor.

14. The method according to claim 13 further comprising, performing, by a temporal denoiser, a temporal denoising process based on received original image frames, wherein the step of obtaining image frames in a sequence of image frames comprises the compressor obtaining successive accumulated image frames that have been processed by the temporal denoiser.

15. A system for reducing the appearance of block-related artifacts, the system comprising:

one or more processors and one or more storage, wherein one or more storage stores computer-readable instructions that when executed by the one or more processors cause the system to:

receive image frames in a sequence of image frames;

adjust some or all image frames in the sequence of image frames to generate adjusted image frames to shift a block origin relative to image data of the image frame so that a position of the block origin relative to the image frame prior to shifting the block origin varies during the sequence of image frames, wherein adjusting the image data comprises generating image data and adding the generated image data to one or more edges of the image frame or discarding image data from one or more edges of the image frame, wherein an amount of generated image data added or discarded varies during the sequence of image frames; and apply a block-based process to each adjusted image frame in the sequence of image frames to generate processed image frames, wherein blocks of image data are selected and processed in each adjusted frame of image data according to the block origin.

16. A non-transitory computer readable storage medium storing a program that, when executed by an information processing apparatus, causes the information processing apparatus to perform the method of claim 1.

17. A method for reducing the appearance of block-related artifacts, the method comprising:

obtaining image frames in a sequence of image frames;

adjusting some or all image frames in the sequence of image frames to generate adjusted image frames to shift a block origin relative to image data of the image frame so that a position of the block origin relative to the image frame prior to shifting the block origin varies during the sequence of image frames, wherein adjusting the image data comprises generating image data and adding the generated image data to one or more edges of the image frame or discarding image data from one or more edges of the image frame;

applying a block-based process to each adjusted image frame in the sequence of image frames to generate processed image frames, wherein blocks of image data are selected and processed in each adjusted frame of image data according to the block origin;

performing a deprocessing corresponding to the block-based process to each processed frame in the sequence of image frames to generate deprocessed frames; and cropping the deprocessed image frames to perform one of: removing generated image data that has been added to one or more edges of the image frame and cropping the deprocessed image frame, wherein the step of adjusting some or all the image frames and the step of cropping the deprocessed image frames are synchronized based on position in the sequence of image frames so that an amount of image data removed by the cropping is determined based on the position of an image frame within the sequence of image frames.

18. The method according to claim 17, wherein all image frames in the sequence of image frames are adjusted, wherein some image frames in the sequence of image frames are further adjusted to add or discard image data in order to keep all adjusted image frames the same size.

19. The method according to claim 17, wherein the method is performed by a temporal denoising system, and wherein the steps of adjusting image frames and applying a block-based process to each adjusted image frame are performed by a compressor and the steps of performing a deprocessing corresponding to the block-based process and cropping the deprocessed image frames are performed by a decompressor.

20. The method according to claim 19, further comprising, performing, by a temporal denoiser, a temporal denoising process based on received original image frames, wherein the step of obtaining image frames in a sequence of image frames comprises the compressor obtaining successive accumulated image frames that have been processed by the temporal denoiser.

* * * * *